United States Patent
Federgreen

(10) Patent No.: US 8,626,671 B2
(45) Date of Patent: Jan. 7, 2014

(54) SYSTEM AND METHOD FOR AUTOMATED DATA BREACH COMPLIANCE

(71) Applicant: CSRSI, Inc., Jensen Beach, FL (US)

(72) Inventor: Warren Ross Federgreen, Jensen Beach, FL (US)

(73) Assignee: CSRSI, Inc., Jensen Beach, FL (US)

( * ) Notice: Subject to any disclaimer, the term of this patent is extended or adjusted under 35 U.S.C. 154(b) by 0 days.

(21) Appl. No.: 13/743,931

(22) Filed: Jan. 17, 2013

(65) Prior Publication Data

US 2013/0262329 A1 Oct. 3, 2013

Related U.S. Application Data

(63) Continuation-in-part of application No. 13/435,126, filed on Mar. 30, 2012.

(51) Int. Cl.
*G06Q 99/00* (2006.01)

(52) U.S. Cl.
USPC .......................................................... 705/317

(58) Field of Classification Search
USPC .......................................... 705/1.1, 317, 500
See application file for complete search history.

(56) References Cited

U.S. PATENT DOCUMENTS

| | | |
|---|---|---|
| 2006/0248028 A1 | 11/2006 | Tedesco et al. |
| 2008/0047016 A1 | 2/2008 | Spoonamore |
| 2008/0103800 A1* | 5/2008 | Domenikos et al. ............. 705/1 |
| 2010/0205014 A1* | 8/2010 | Sholer et al. ..................... 705/4 |
| 2011/0131123 A1 | 6/2011 | Griffin et al. |
| 2012/0047553 A1 | 2/2012 | Stronger et al. |

* cited by examiner

*Primary Examiner* — Jonathan Ouellette
*Assistant Examiner* — Michael Thompson

(57) ABSTRACT

Computer-implemented methods and systems for data breach compliance are disclosed. Organization related information may be received. Breach information relating to a data breach event of the organization may be received. The breach information may include, for example, breach event description information, compromised personally identifiable information, and remediation action information. A breach report may be generated based on the breach information, the organization related information, and one or more rules related to data breach. At least one reporting entity may be determined based on the organization related information, the breach information, and the one or more rules. The breach report may be output.

20 Claims, 6 Drawing Sheets

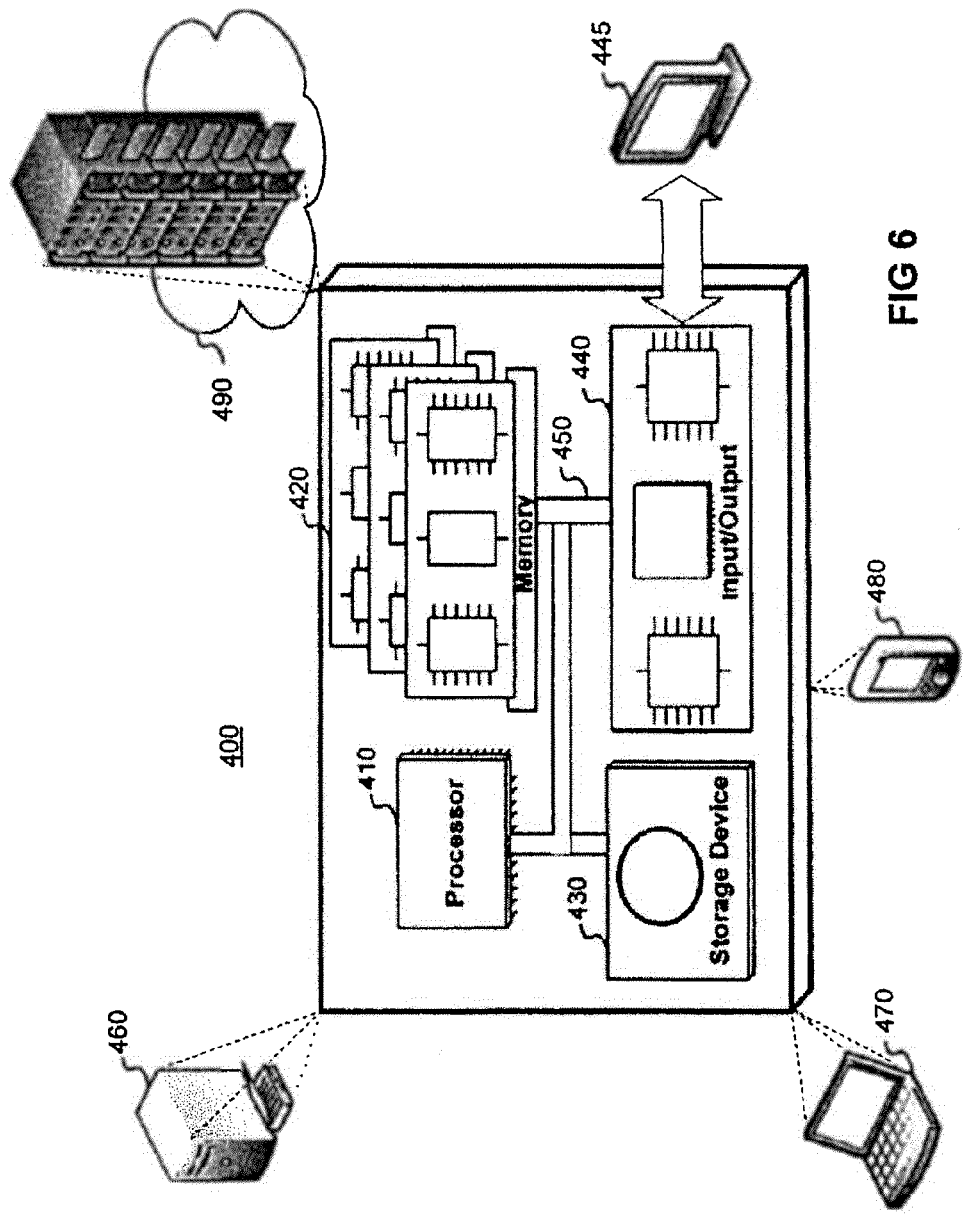

SYSTEM AND METHOD FOR AUTOMATED DATA BREACH COMPLIANCE

CROSS REFERENCE TO RELATED APPLICATION

This application is a continuation-in-part of U.S. Nonprovisional application Ser. No. 13/435,126 filed on Mar. 30, 2012, which is incorporated by reference in its entirety herein.

BACKGROUND

Many organizations obtain, store, and/or safeguard private information and/or data relating to individuals. Data breach events may occur in which private data becomes unprotected, is removed, is stolen, and/or otherwise transferred from the control of an organization. Breach events may result from, for example, the actions of malicious outside parties, accidental disclosure, and/or other causes. Upon the occurrence of a breach event, one or more entities including, for example, federal government, state government, foreign government, political union, law enforcement, private entity, and other entities may each require compliance with complex specific rules, regulations, and laws related to data breach reporting. Complying with all of the applicable laws, rules, and regulations upon the occurrence of a data breach event may therefore be cumbersome.

SUMMARY

Briefly, aspects of the present disclosure are directed to methods and systems for data breach compliance. Organization related information may be received. Breach information relating to a data breach event of the organization may be received. The breach information may include, for example, breach event description information, compromised personally identifiable information, and remediation action information. A breach report may be generated based on the breach information, the organization related information, and one or more rules related to data breach. At least one reporting entity may be determined based on the organization related information, the breach information, and the one or more rules. The breach report may be output.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect." The aspects described above and other aspects of the present disclosure described herein are illustrated by way of example(s) and not limited in the accompanying figures.

BRIEF DESCRIPTION OF THE DRAWINGS

A more complete understanding of the present disclosure may be realized by reference to the accompanying figures in which:

FIG. 6 is a schematic diagram depicting a representative computer system for implementing and exemplary methods and systems for performing automated data breach compliance according to aspects of the present disclosure.

Figure 1:
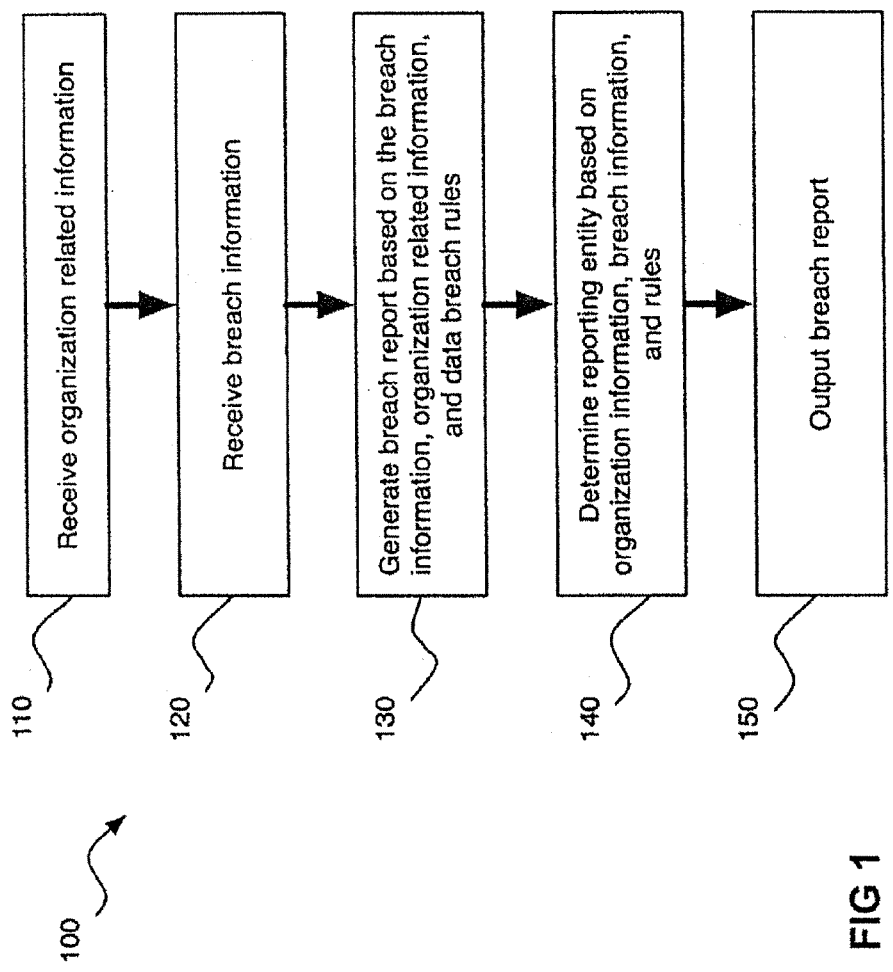
FIG. 1 is a flowchart of a method according to aspects of the present disclosure.

The illustrative aspects are described more fully by the Figures and detailed description. The present disclosure may, however, be embodied in various forms and is not limited to specific aspects described in the Figures and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles and aspects of the disclosure, as well as specific examples thereof, are intended to encompass both structural and functional equivalents thereof. Additionally, it is intended that such equivalents include both currently known equivalents as well as equivalents developed in the future, for example, any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the Figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and nonvolatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

Methods and systems of the present disclosure may aid an organization (e.g., a business entity, government entity, non-profit organization, and/or other type of organization) in complying with state, federal, international, private sector, industry, and other entity rules, laws, and regulations in the event of a data breach. A breach event as discussed herein may refer to a data breach event, a suspected data breach event, or any other similar occurrence.

In FIG. 1, there is shown a flowchart 100, which defines steps of a method according to aspects of the present disclosure. Methods and systems of the present disclosure may be implemented using, for example, a computer system 400 as depicted in FIG. 6 or any other system and/or device.

In operation 110, organization related information may be received. An organization may be, for example, a business, a group, a not-for-profit organization, a governmental entity, education based organization, a financial services organization, health care related organization, and/or any other type of organization. The organization related information may include information describing, representative of, and/or relating to an organization. Organization related information may include, for example, organization name(s), address(es), telephone number(s), web address(es), Email address(es), date of founding, representative name(s), and other information related to the organization. Organization related information may include, for example, geographic locations (e.g., cities, states, regions, countries, or any other type of location) in which an organization engages in business. Organization related information may include description of activities of the organization, types of business the organization engages in, whether the organization is active or inactive, whether the organization is engaged in E-commerce, whether the organization participates in one or more states' Electronic Benefits Program (EBT), and/or any other information relating to the organization.

In some aspects, an organization may, for example, store information related to one or more individuals. An organization may, for example, store information in an electronic storage location, physical storage location, and/or any other type of storage. The stored information may include, for example, personally identifiable information (PII) related to one or more individuals.

In some aspects, organization related information may be received from a user via an input/output device (e.g., input/output structure 440 of FIG. 6). A user may, for example, enter information into system using a keyboard, pointer device, mouse, microphone, camera, and/or any other type of input device. In some aspects, organization related information may be received from a system, device, and/or apparatus separate from system 400. Organization related information may, for example, be transferred to system 400 over any suitable communication medium (e.g., the internet) in, for example, a data file. In some aspects, information regarding a breach event may be communicated over the phone, and a representation of the telephone communication (e.g., a phone conversation) may be received as breach information.

In operation 120, breach information related to a data breach event of the organization may be received. The breach information may include, for example, breach event description information, compromised PII, and remediation action information. A breach event may occur in many different circumstances in which information is transferred to, moved to, altered by, disclosed to, and/or otherwise accessed by a third party. A breach event may be the result of, for example, theft, trespass, loss, and/or other type of wrongdoing. A breach event may also occur inadvertently.

Breach event description information (e.g., a description of the breach event) may include, for example, a description of a breach event or suspected breach event. Breach event information may include, for example, names of persons associated with review of the breach event. Breach event information may, for example, include date(s) on which the breach occurred, estimated or actual time(s) at which the breach occurred, estimated or actual time(s) at which the breach is suspected to have occurred, date and/or time(s) at which the breach was discovered, location(s) of breach event, a description of the breach event, and/or any other information related to the breach event. Breach event information may include equipment related to the breach event. Equipment related to the breach event may include, for example, electronic data storage equipment (e.g., on computer(s), laptop(s), mobile device(s), server(s), hard-drive(s), portable storage device(s), thumb drive(s), USB device(s), CD(s), DVD(s), tape(s), and/or or any other electronic storage location and/or media), physical storage equipment (e.g., a vault, locked room, protected room, safe, and/or other physical storage equipment). Breach event information may include information representing impact on parties and/or entities associated with and/or related to the organization (e.g., data hosting companies, middleware software applications, business associates, banks, financial institutions, merchant service providers, or other parties). Breach event information may include, for example, a description of the facts associated with the event including whether the breach event was a loss or theft of a device and/or media, an internal system breach, a result of insider wrongdoing, an external system breach (e.g., hacking, cracking, and/or theft), an inadvertent disclosure, and/or any other type of event.

Compromised PII may include, for example, information disclosed, stolen, removed, compromised, acquired, and/or otherwise interfered with as a result of the breach event. PII may include, for example, information that may be used to uniquely identify, contact, and/or locate a single individual. PII may include, for example, name, date of birth, social security number, driver's license number, credit card number, debit card number, check routing number, check transit number, bank account numbers, tax identification numbers, personal identification number(s) (PIN), security code(s), access code(s), medical information, and/or any other type of information that may be used to uniquely identify an individual. Compromised PII may include a list of individuals, number of individuals, or other data representing the individuals affected by a breach event. By way of example, compromised PII may include names, residence information (e.g., address, city, state, and/or country of residence), type(s) of PII disclosed (e.g., a name or other personal identifier and social security number, driver's license number, financial account number, credit card number, etc.), and possibly other information representative of individuals affected by the data breach.

Remediation action information may include, for example, information relating to actions taken and/or performed by an organization in response to a breach event. In response to a breach, an organization may, for example, perform actions including notifying entities (e.g., law enforcement authorities, credit card companies, parent company, affiliates, customer(s), bank(s), ISO/Merchant service provider(s), government entities, and/or other entities as discussed below), performing internal investigation(s), conducting internal audit(s), and/or any other action(s) taken by an organization in response to a breach event. An organization may, for example, confiscate equipment related to the breach event. An organization may, for example, respond to a breach event by changing data storage policies, increasing security measures, altering data storage locations, increasing protection of stored information, and performing other actions. Remediation action information may include, for example, a description of actions performed, date and time of actions performed, and possibly other information.

In some aspects, breach information may be received in an input field (e.g., in a web browser, word processing application, or other type of application) from a user. Breach information may alternatively be received at, for example, system 400 as a text file (e.g., comma separated values file), spreadsheet, or other type of data file. Text received at system 400 may be organized and/or separated into breach event description information, compromised PII, and remediation action information using text recognition, data mining, or other techniques.

In some aspects, information regarding a breach event may be received through an application programming interface (API), for example, associated with the system 400. For example, an API may be provided to an organization (e.g., a financial institution). The API may be included in (e.g., embedded in) a secure web-page, for example, accessible only by representatives of the organization. Upon detection of a breach event, breach information may be entered by the organization (e.g., the financial institution) into data entry fields within the API.

In some aspects, audio representative of breach information may be received and the audio may be converted to text using a speech-to-text conversion operation or any other suitable audio conversion operation. By way of example, a user may provide audio (e.g., a voice recording, a voicemail message, a recorded phone call) including information related to a data breach. The audio may be received by, for example, system 400 and may be converted to text using any suitable speech-to-text operation. The text may be organized and/or separated by system 400 into breach event description information, compromised PII, and remediation action information. The text may be organized and/or separated using text recognition, data mining, or other techniques. For example, audio may be converted to text, and the text may be searched for one or more keywords, phrases, or terms. The keywords, phrases, or terms may, for example, relate to the breach event description, PII, remediation action information, or other information associated with data breach. The text may be categorized into breach event description information, compromised PII, and remediation action information based on the results of the search.

In operation 130, a breach report may be generated based on the breach information, the organization related information, and rules related to data breach (e.g., data breach reporting rules). For example, a breach report may be or may include a document, populated form, table, audio recording, video, and/or any other medium for presenting information. A breach report may, for example, include organization related information, breach event description information, compromised PII, remediation action information, and other information organized in a predetermined format. The predetermined format may, for example, be dictated by applicable data breach reporting rules (e.g., state laws, federal laws, private entity rules), clarity considerations, and/or other factors. In some aspects, the predetermined format may be determined based on applicable international (e.g., European Union (EU) and/or foreign country) data breach reporting rules and/or regulations.

Rules related to data breach may be, for example, federal laws (e.g., federal privacy laws); federal regulations (e.g., federal privacy regulations); federal court opinions; federal trade commission (FTC) administrative decisions and consent decrees; state laws; state regulations; state attorney general consent decrees; company privacy policies; industry policies; international privacy laws (e.g., EU privacy laws or any country's privacy laws); international regulations (e.g., EU privacy regulations or any country's privacy regulations); international court decisions and/or opinions; and/or any other rules, regulations, statutes, laws and/or guidelines.

In some aspects, a breach report may be generated based on the organization related information, breach information, and rules related to data breach. The organization related information, breach information, and rules related to data breach may be used to, for example, determine the rules applicable to a specific data breach event of an organization. The one or more data breach reporting rules, organization related information, breach information, and possibly other information may, for example, be stored in a database and organized into matrices or any other suitable data structure. In order to determine the rules related to data breach applicable to a specific data breach event, organization related information, breach information, and potentially other information may be compared to rules related to data breach (e.g., stored in a database). Text searching, data comparison, and other operations may be used to determine rules applicable to the data breach. Conditional logic may, for example, be used to determine which of one or more data breach reporting rules may be applicable based on the organization related information, the breach information, and possibly other information. In some aspects, a decision tree, graphical model, or other suitable approaches may be used to determine applicable data breach reporting rules.

In operation 140, at least one reporting entity may be determined and/or selected based on the organization related information, breach information, one or more rules, and possibly other information. A reporting entity may be, for example, a federal government agency (e.g., Office for Civil Rights, Office of Health and Human Services, Secret Service, and/or any other government agency), a state government agency (e.g., Office of the Attorney General for a state, Office of Cyber Security, Department of State Division of Consumer Protection, State Department of Health, or any other state government agency), international government agency (e.g., an EU and/or foreign government agency) private entity (e.g., a credit card company, a business, an organization, and/or any other private entity), an individual (e.g., an individual affected by the data breach event), and/or any other entity.

At least one reporting entity may be determined and/or selected based on the organization related information, breach information, and one or more rules applicable to data breach. There may be, for example, no single law (e.g., state law, federal law, international law, law of a foreign country, etc.), statute and/or regulation that governs an organization's obligations in the event of a data breach. Instead, there may be an evolving patchwork of international, federal, and states laws and regulations; E-transaction laws; evidentiary rules; industry standards; and other rules governing the use of personal information. Text searching, data comparison, and other operations may be used to determine rules applicable to the data breach. Conditional logic may, for example, be used to determine which of one or more data breach reporting rules may be applicable based on the organization related information, the breach information, and possibly other information. In some aspects, a decision tree, graphical model, or other suitable approaches may be used to determine applicable data breach reporting rules. Based on the applicable rules, at least one reporting entity may be determined and/or selected.

In some aspects, rules (e.g., federal laws, state laws, private entity rules, and/or any other rules) related to and/or applicable to data breach may be updated, modified, and/or altered. Updates to rules applicable to data breach may be received from, for example, subscription services, organizational memberships, news data feeds, and/or any other source of information. The information used to update applicable rules may, for example, be reviewed, monitored, curated, and/or supervised by a user (e.g., a subject matter expert in, for example, data breach compliance). Similarly, outdated information may be removed from a database of rules by, for example, system 400 and/or a user. A process of determining a reporting entity may be updated and/or refined based on additions, changes, and/or modifications to rules related to and/or applicable to data breach.

In some aspects, the reporting entities associated with a breach report may be determined based on remediation action information. For example, if the remediation action information indicates that an entity has been notified, that entity will not be selected or determined to be a reporting entity.

According to some aspects, reporting entities may be determined based on at least one geographic location associated with the data breach event. The at least one geographic location may be based, for example, on organization related information, breach information, and one or more rules related to data breach. By way of example, if the organization is a business incorporated in and/or having a presence in a specific state, that state's laws may be applicable to a data breach event of that organization. Similarly, if PII related to individuals who reside in a certain state is breached and that state's laws include long reach and/or long arm provisions extending its jurisdiction to other states, that state's laws may be applicable to the data breach event. If, for example, compromised PII includes information related to residents of multiple countries and/or countries other than the United States, international laws (e.g., EU or foreign country rules and regulations) may be applicable to a data breach event of that organization.

According to some aspects, reporting entities may be determined and/or selected based on one or more types of breached data. One or more types of breached data may be determined based on, for example, compromised PII. For example, compromised PII may include health care related information (e.g., medical records) associated with one or more individuals. State laws, federal laws (e.g., Health Insurance Portability and Accountability Act of 1996 (HIPAA), Health Information Technology for Economic and Clinical Health (HITECH)), federal agency regulations, and other rules applicable to health care privacy and/or security may be deemed applicable. A reporting entity may, for example, be determined based on applicable rules and the type of data breached. For example, federal, state, international, foreign country, and possibly other health care related agencies may be deemed reporting entities.

In operation 150, a breach report may be output. A breach report may, for example, be output to a user of system 400. A breach report may, for example, be output to a reporting entity (e.g., crime enforcement agency, federal government agency, state agency, foreign government agency, private entity, credit card company, and/or other type of entity).

In some aspects, a list or other data structure including one or more reporting entities and addresses associated with the reporting entities may be generated based on the organization related information, the breach information, and the rules related to the data breach event. A breach report may be output to the reporting entities at the addresses. An address associated with an reporting entity may be, for example, a mailing address, an email address, a website address, an file transfer protocol (FTP) site, or any other type of address. The breach report may be output to the reporting entity at the address by, for example, transmitting the report to the address via email, electronic file transfer (e.g., FTP file transfer), or using other approaches. The breach report may be output as one or more physical documents, a digital file, or any other format.

In some aspects, a database may be updated to include received organization related information, breach information, and a generated breach report. The database may include information relating to multiple organizations, multiple data breach events, and other related information. The database may be used to analyze information related to breach events. In some aspects, a request for one or more breach reports related to a selected organization may be received. In response to the request, a list of breach reports related to a selected organization may be generated based on the organization related information, the breach information, and one or more breach reports in the database.

Figure 2:
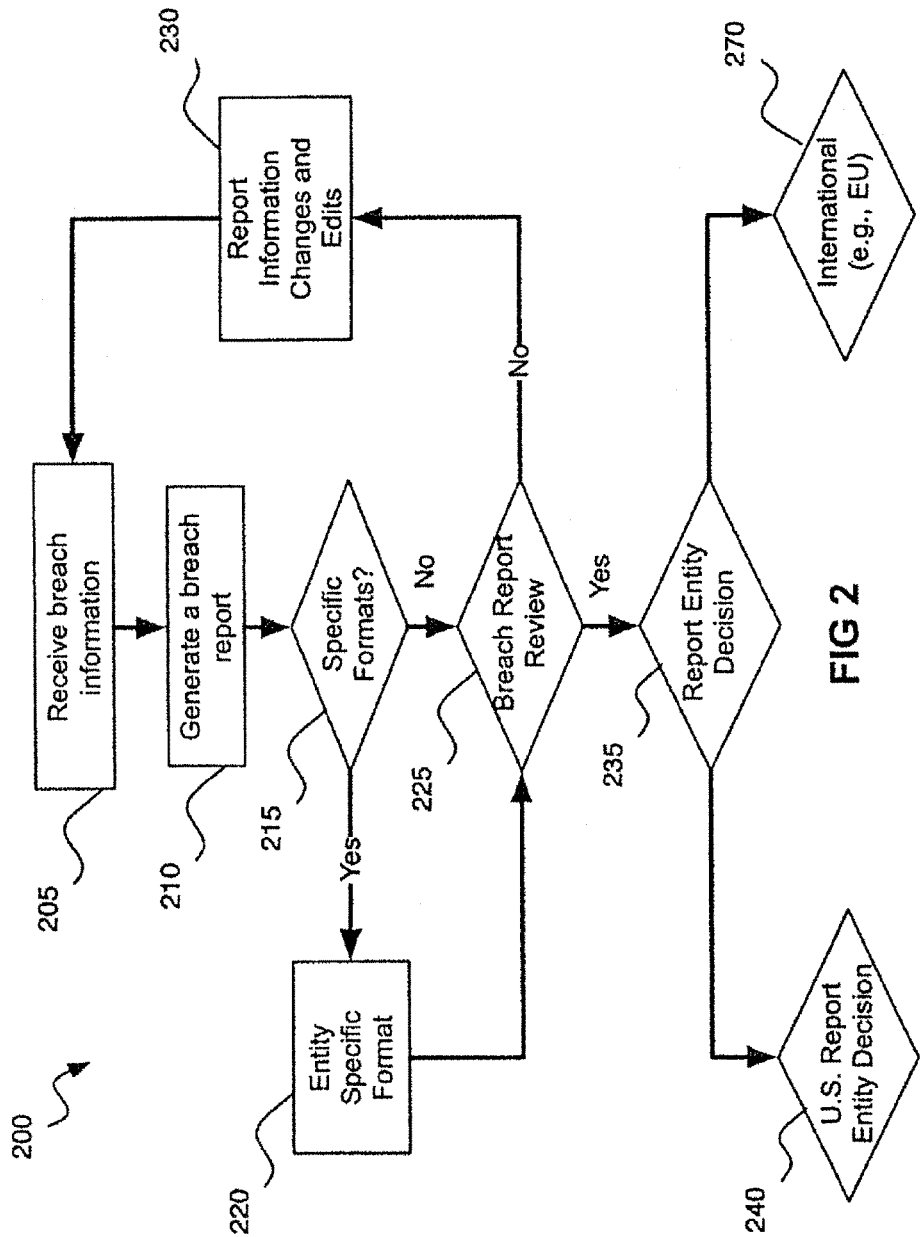
FIG. 2 is a flow diagram depicting operations of a method according to aspects of the present disclosure.

In FIG. 2, there is shown a flow diagram 200, which defines steps of a method according to aspects of the present disclosure. Organization related information may be received and, in some aspects, stored during an account or profile creation operation. An account or profile associated with an organization may be generated to include organization related information (e.g., name of organization, contact information, and other information as discussed previously in connection with FIG. 1).

In response to a data breach event or suspicion of a data breach event, breach information may be received 205 by, for example, system 400. As described above, a breach report may be generated 210 based on the stored organization related information, breach information, and rules related to data breach. Based on a comparison of the organization related information, the breach information, and rules related to data breach, it may be determined 215 whether the breach report is in a proper format. In some aspects, whether a breach report is in a proper format may be determined based on, for example, state rules, federal rules, international rules (e.g., EU regulations), industry standards, or other rules applicable to the breach event. For example, rules related to data breach reporting in New York, North Carolina, some federal agencies, and possibly other entities may require breach reports be generated in an entity specific format. An entity specific format may be, for example, a form including predetermined data entry fields or any other type of format. A breach report may be generated and/or modified 220 to conform to an entity specific format.

In some aspects, a breach report may be reviewed 225 to ensure that the breach report includes correct information, complete information, correctly formatted information, and otherwise conforms to a predefined set of standards. In a review operation 225, a breach report may be output to, for example, a user, to a system external to system 400, and/or any other system or device for review. Modified and/or updated organization related information and breach information may be received 230 by, for example, system 400. Modified organization related information and modified breach information may be generated by, for example, system 400 in an error detection and/or correction operation performed on the breach report. Modified organization related information and modified breach information may be generated by a user (e.g., a breach report review specialist) based on, for example, a review of the breach report. The breach report may be updated based on the modified organization related information and modified breach information. A breach report may be updated by, for example, generating a breach report 210 based on modified organization related information, modified breach information, and data breach reporting rules.

In some aspects, at least one reporting entity may be determined or selected 235 based on the organization related information, the breach information, and one or more rules. If, for example, the data breach occurred in the United States and/or affected United States citizens, residents, and/or people located in the United States, at least one reporting entity may be determined or selected 240 based on rules related to the U.S. federal government, state government(s), and/or other entities. If, for example, the data breach occurred in a country other than the U.S. and/or affected non-U.S. citizens, residents, and/or people located outside the United States, at least one reporting entity may be determined 270 based on rules related to the one or more political unions (e.g., the European Union), foreign government(s), state government(s), and/or other entities.

Figure 3:
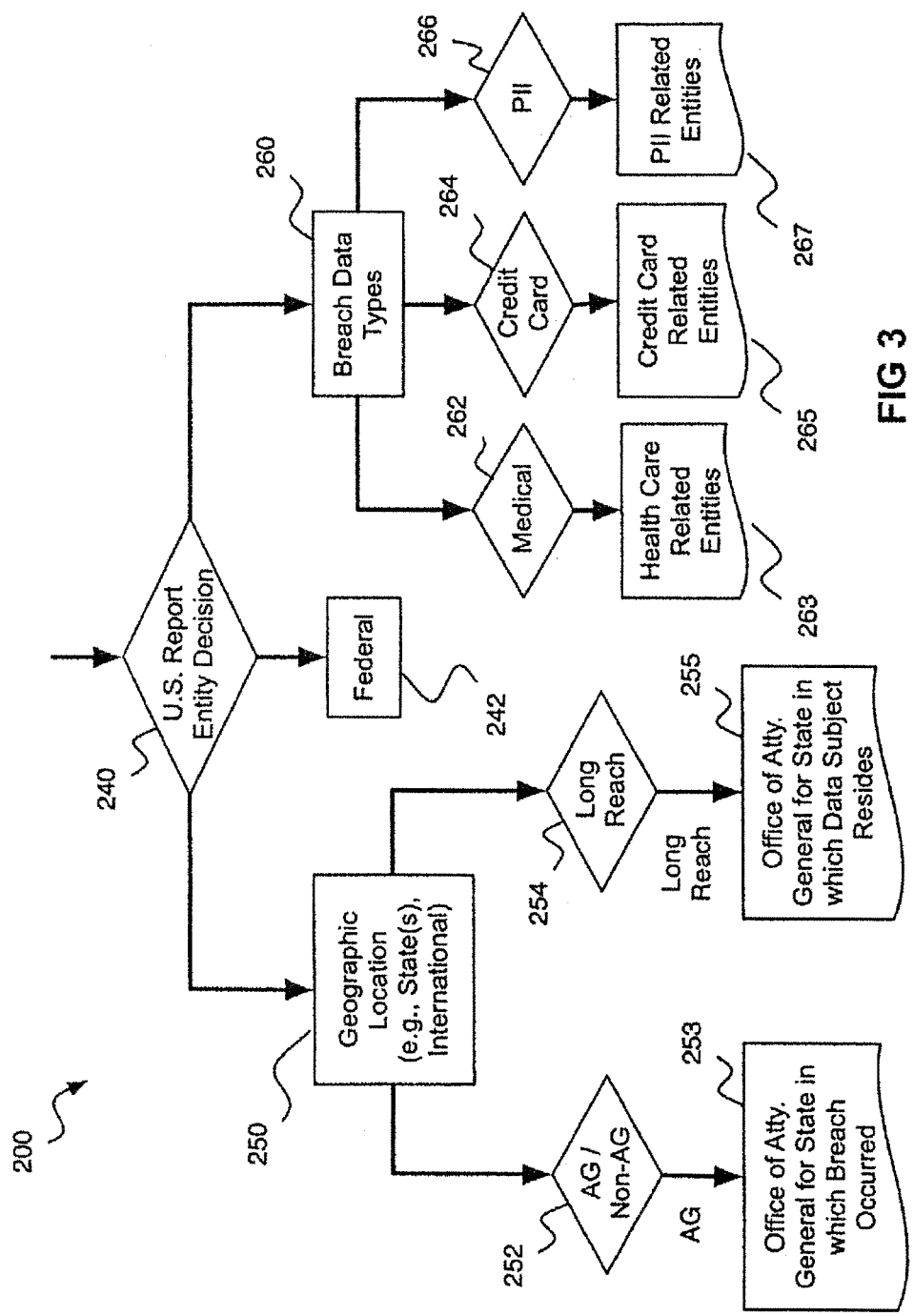
FIG. 3 is a flow diagram depicting operations of a method according to aspects of the present disclosure.

In FIG. 3, there is shown a flow diagram 200, which defines steps of a method according to aspects of the present disclosure. The flow diagram shown in FIG. 3 may, in some aspects, be associated with the flow diagram(s) shown in FIG. 2 and/or FIG. 4 below. The flow diagrams shown in FIG. 2, FIG. 3, and/or FIG. 4 may, for example, constitute one flow diagram depicting the steps of a method according to aspects of the present disclosure.

According to some aspects, when a data breach occurs in the United States and/or affects United States citizens, residents, and/or people located in the United States, at least one reporting entity may be determined or selected 240 based on rules related to the U.S. federal government, U.S. state government(s), and/or other entities. In some aspects, if the data breach occurred in the United States and/or affected United States citizens, residents, and/or people located in the United States, the federal government (e.g., Federal Bureau of Investigation and/or other agencies within or associated with the federal government) may require notification, reporting, and/or consultation 242 regarding the breach within a predetermined period of time. A breach report may be output 242 to an entity associated with the U.S. federal government.

According to some aspects, a reporting entity may be determined or selected 250 based on a geographical location associated with the breach. A geographical location associated with the breach event may be, for example, a state in which an organization is located, where a business is incorporated and/or registered, a state in which facilities and/or equipment owned by the organization are located (e.g., offices, retail locations, manufacturing facilities, server location(s)), and/or a state which is otherwise related to the organization and/or to the breach event. A geographical location associated with the breach event may be, for example, a state, county, or other location where an individual affected by the breach resides, is domiciled, or is otherwise located. It may, for example, be determined whether the geographic location associated with the breach event is in the United States, one or more states, or any other geographic region.

In some aspects, reporting entities may be determined or selected 252 based on attorney general reporting rules (e.g., included in rules related to a data breach event) for a state (e.g., a geographical location). Whether any attorney general reporting rules are applicable may be determined based on the attorney general rules related to a data breach event. Some states may, for example, require consultation, reporting, and/or notification of the attorney general of that state. And, some states may require reporting to the attorney general's office of that state, for example, within a set period of time (e.g., within five days of discovery of the breach or any other period of time), if the breach occurred in that state (e.g., the organization is located in that state, equipment associated with the breach is located within that state, etc.). The breach report may be output 253 to at least one reporting entity determined or selected based on attorney general report rules.

In some aspects, reporting entities may be determined or selected 254 based on long reach and/or long arm attorney general reporting rules (e.g., included in rules related to a data breach event) for a state (e.g., a geographical location). Rules related to a data breach event (e.g., long reach rules) for some states may require consultation, reporting, and/or notification of the attorney general of that state if a resident of that state or predetermined number of residents of that state are affected by a data breach. The breach report may be output 255 to at least one reporting entity determined or selected based on long reach and/or long arm attorney general reporting rules for a state.

According to some aspects, one or more reporting entities may be determined or selected 260 based on one or more types of breached data. One or more types of breached data may be determined based on, for example, compromised PII, breach event description information, organization related information, or any other information related to the breach event.

In some aspects, one or more reporting entities may be determined or selected 262 based on whether the breached data includes health care related information. Health care related information (e.g., medical records, patient records, prescription records, and/or other health care related information or data) and health care related laws, regulations, and rules (e.g., HIPAA, HITECH, or other health care related laws) may be applicable to the data breach event. Based on the applicable health care related rules, at least one reporting entity associated with health care (e.g., Office of Civil Rights, Office of Health and Human Services, Secret Service regional office, and/or other entities) may be determined and/or selected. And a breach report may be output 263 to a reporting entity associated with health care.

According to some aspects, one or more reporting entities may be determined or selected 264 based on whether the breached data includes credit card related information. Credit card related information may include, for example, credit card number(s), credit card personal identification number(s), or other information. The credit card related information may be associated with one or more credit card companies (e.g., American Express, Visa, MasterCard, Discover, or any other credit card company), and credit card company rules may be applicable to the data breach event. Based on the credit card company rules, at least one credit card company may be deemed and/or selected as a reporting entity. And a breach report may be output 265 to the credit card company (e.g., a reporting entity).

According to some aspects, one or more reporting entities may be determined or selected 266 based on whether the breached data includes PII. When breached data includes, for example, PII, certain federal, state, international, private entity, and/or other types of rules, regulations, and laws may be applicable. Based on the applicable rules, regulations, and laws, at least one reporting entity (e.g., the Secret Service and/or any other entity) may be determined 266, and the breach report may be output 267 to the at least one PII related reporting entity.

Figure 4:
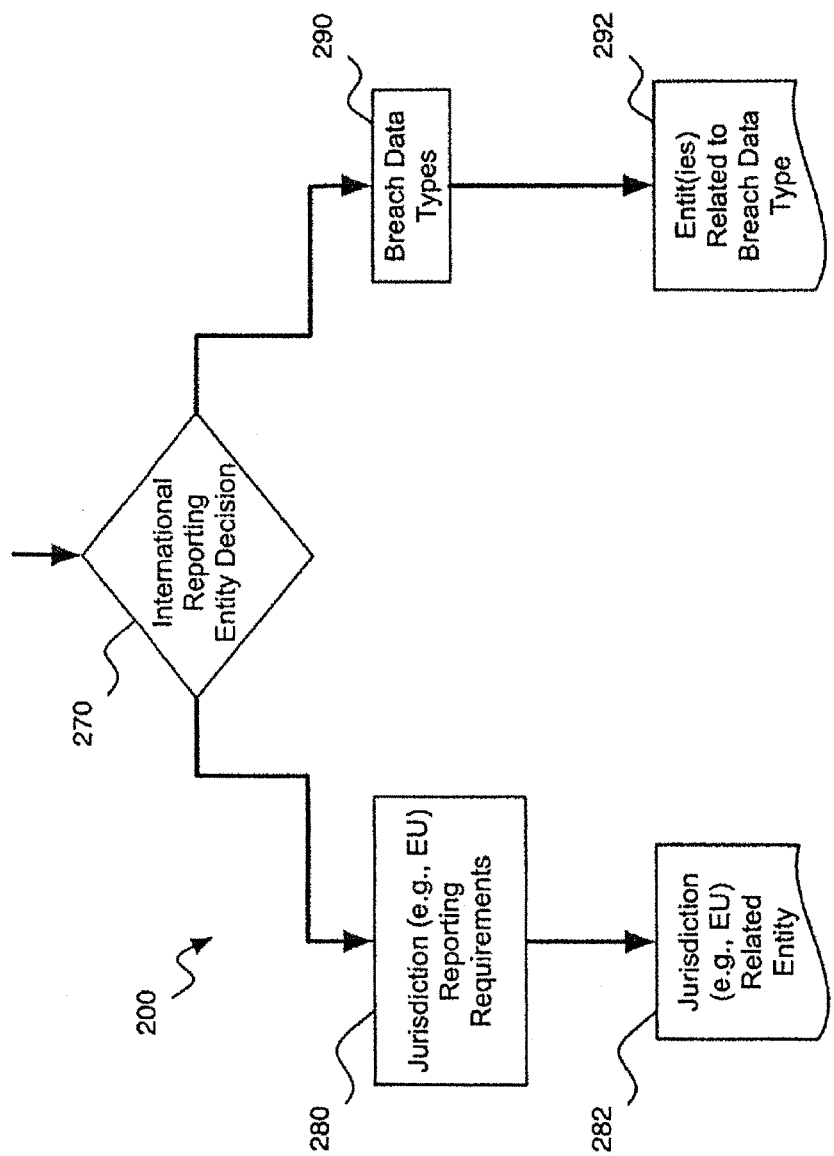
FIG. 4 is a flow diagram depicting operations of a method according to aspects of the present disclosure.

In FIG. 4, there is shown a flow diagram 200, which defines steps of a method according to aspects of the present disclosure. The flow diagram shown in FIG. 4 may, in some aspects, be associated with the flow diagram(s) shown in FIG. 2 and/or FIG. 3. The flow diagrams shown in FIG. 2, FIG. 3, and/or FIG. 4 may, for example, constitute one flow diagram depicting the steps of a method according to aspects of the present disclosure.

According to some aspects, when a data breach occurs in a country other than the U.S. and/or affects non-U.S. citizens, residents, and/or people located outside the United States, at least one reporting entity may be determined or selected 270 based on rules related to the one or more political unions (e.g., the European Union), foreign government(s), state government(s), and/or other entities.

In some aspects, if the data breach occurred outside of the United States and/or affected non-U.S. citizens, residents, and/or people located outside the United States, an entity associated with a foreign government (e.g., the EU) may require notification, reporting, and/or consultation regarding the breach within a predetermined period of time.

According to some aspects, a reporting entity may be determined and/or selected 280 based on an international jurisdiction associated with the breach. An international jurisdiction associated with the breach event may be, for example, a political union (e.g., the EU), a foreign country, and/or state in a foreign country in which an organization is located, where a business is incorporated and/or registered, in which facilities and/or equipment owned by the organization are located (e.g., offices, retail locations, manufacturing facilities, server location(s)), and/or which is otherwise related to the organization and/or to the breach event. An international jurisdiction associated with the breach event may be, for example, a political union (e.g., EU), country, state, or other location where an individual affected by the breach resides, is domiciled, or is otherwise located. It may, for example, be determined whether the geographic location associated with the breach event is in Canada, the EU, or any other geographic region.

In some aspects, a breach report may be output 282 to one or more reporting entities (e.g., jurisdiction related reporting entities) that are determined or selected based on rules associated with the international jurisdiction. For example, a breach report may be output to one or more reporting entities determined and/or selected based on data breach reporting rules associated with the EU (e.g., EU data breach reporting rules). The one or more reporting entities may be, for example, associated with one or more countries in the EU.

According to some aspects, a reporting entity may be determined or selected 290 based on one or more types of breached data. One or more types of breached data (e.g., health care related information, credit card related information, PII) may be determined based on, for example, compromised PII, breach event description information, organization related information, or any other information related to the breach event. One or more reporting entities may be determined 290 based on the one or more types of breached data and rules associated with the one or more types of breached data in the international jurisdiction, country, state, or other entity. A breach report may be output 292 to the entity associated with the type of breached data.

According to some aspects, one or more types of breached data may include PII, and certain international jurisdiction rules (e.g., EU rules) other types of rules, regulations, and laws related to PII may be applicable. Based on the applicable rules, regulations, and laws related to PII, at least one reporting entity (e.g., an EU related entity) may be determined 290, and the breach report may be output 292 to the at least one reporting entity.

Figure 5:
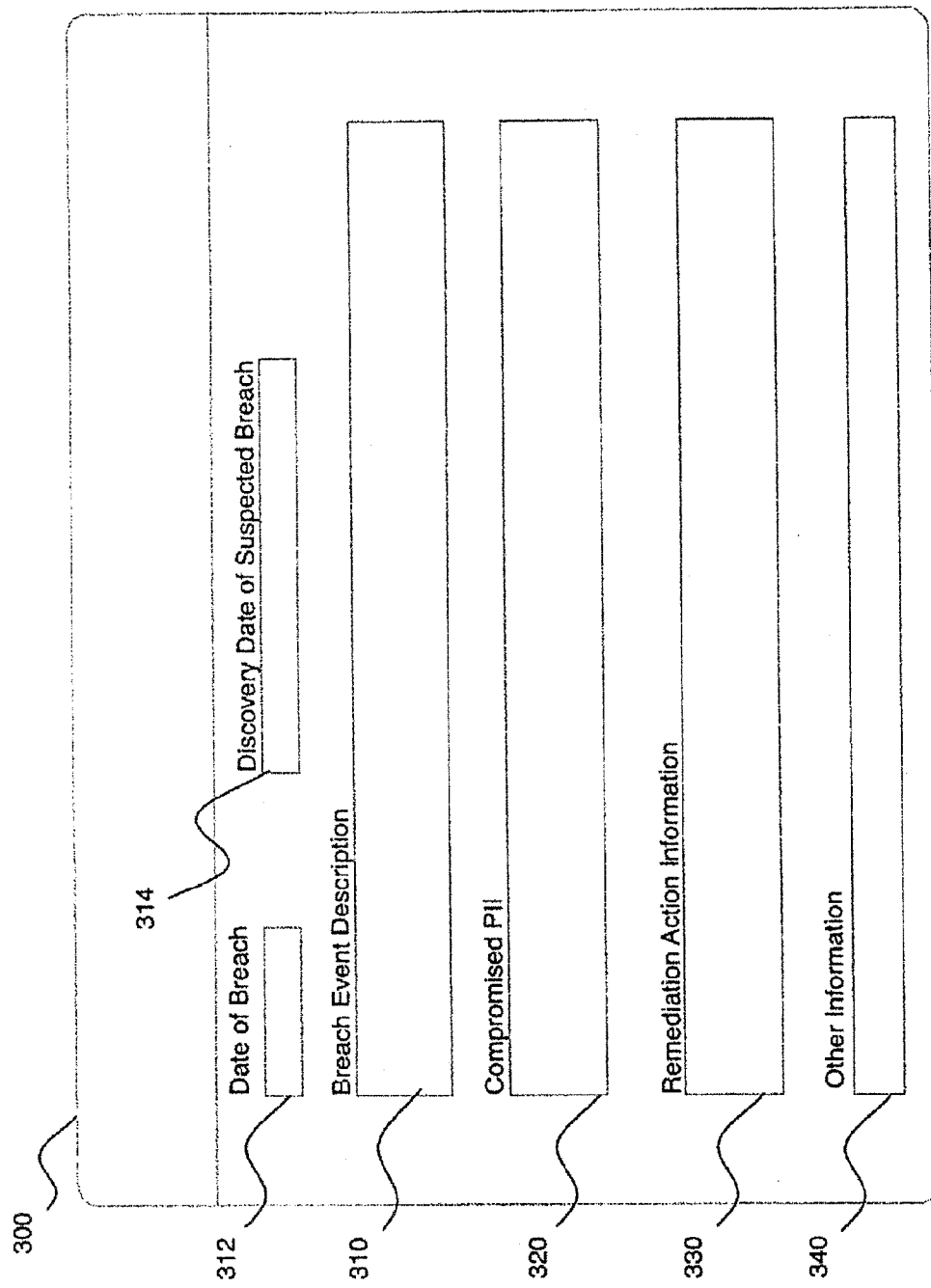
FIG. 5 depicts an aspect of the present disclosure in which breach information is received.

FIG. 5 depicts an aspect of the present disclosure in which breach information is received. Breach information may be received from a user in a data entry interface 300 (e.g., one or more data entry fields in a webpage, online form, etc.). The breach information may include breach event description information 310, compromised PII 320, remediation action information 330, and possibly any other information 340 related to the breach event. Breach event description information 310 may include, for example, a date of the breach event 312, a date of discovery of the breach event or suspected breach event 314. Breach event information may, for example, be received in one or more data entry fields including a breach event description field 310, a compromised PII entry field 320, a remediation action entry field 330, an other information entry field 340, and possibly other data entry fields.

According to some aspects, the data entry interface 300 may be generated based on previously received organization related information, breach event description information, compromised PII, remediation action information, or other information. The data entry fields in the data entry interface 300 may be generated based on the previously received information from an organization. For example, if an organization has previously provided information relating to, for example, a previous data breach, the one or more data entry fields may be generated to include greater or fewer data entry fields based on the previously provided information. The one or more data entry fields may, for example, be customized based on the previously provided information. One or more custom data entry fields may, for example, prompt a user to input specific information relating to or derived from the previously provided information. Modifying the one or more data entry fields based on previous breach events related to an organization may ensure that the data fields are specifically tailored to the organization.

In some aspects, one or more data entry fields (e.g., data entry fields 310, 312, 314, 320, 330, 340) in the data entry interface 300 may be pre-populated based on previously received breach event description information, compromised PII, remediation action information, and possibly any other information related to a previous breach event associated with the organization. A user may, for example, be prompted to check the accuracy of and edit one or more of the pre-populated data entry fields.

In some aspects, the data entry interface 300 including one or more data entry fields may be generated based on breach information associated with one or more additional organizations. For example, if breach information is received from multiple related organizations (e.g., businesses, organizations, or entities in the same industry), data fields for one organization may be generated based on the breach information previously received from other related organizations.

FIG. 6 shows an illustrative computer system 400 suitable for implementing methods and systems according to an aspect of the present disclosure. The computer system may comprise, for example, a computer running any of a number of operating systems. The above-described methods of the present disclosure may be implemented on the computer system 400 as stored program control instructions.

Computer system 400 includes processor 410, memory 420, storage device 430, and input/output structure 440. One or more input/output devices may include a display 445. One or more busses 450 typically interconnect the components, 410, 420, 430, and 440. Processor 410 may be a single or multi core.

Processor 410 executes instructions in which aspects of the present disclosure may comprise steps described in one or more of the Figures. Such instructions may be stored in memory 420 or storage device 430. Data and/or information may be received and output using one or more input/output devices.

Memory 420 may store data and may be a computer-readable medium, such as volatile or non-volatile memory, or any non-transitory storage medium. Storage device 430 may provide storage for system 400 including for example, the previously described methods. In various aspects, storage device 430 may be a flash memory device, a disk drive, an optical disk device, or a tape device employing magnetic, optical, or other recording technologies.

Input/output structures 440 may provide input/output operations for system 400. Input/output devices utilizing these structures may include, for example, keyboards, displays 445, pointing devices, and microphones—among others. As shown and may be readily appreciated by those skilled in the art, computer system 400 for use with the present disclosure may be implemented in a desktop computer package 460, a laptop computer 470, a hand-held computer, for example a tablet computer, personal digital assistant, mobile device, or smartphone 480, or one or more server computers that may advantageously comprise a "cloud" computer 490.

At this point, while we have discussed and described the disclosure using some specific examples, those skilled in the art will recognize that our teachings are not so limited. Accordingly, the disclosure should be only limited by the scope of the claims attached hereto.

What is claimed is:

1. A computer-implemented system for data breach compliance, comprising:
   memory having at least one region for storing computer executable program code; and
   processor for executing the computer executable program code stored in the memory, where the computer executable program code comprises:
   code for receiving information related to an organization;
   code for receiving breach information relating to a data breach event of the organization, the breach information including breach event description information, compromised personally identifiable information (PII), and remediation action information;
   code for generating a breach report based on the breach information, the organization related information, and one or more rules related to data breach;
   code for determining, based on a comparison of the organization related information, the breach information, and one or more of the following: state rules, federal rules, international rules, industry standards, and rules applicable to the breach event, whether the breach report is in the proper format;
   code for modifying the breach report, if it is determined that the proper format is an entity specific format, to include predetermined data entry fields;
   code for selecting one or more reporting entities based on one or more geographic locations associated with the data breach event, where the one or more geographical locations are determined based on the organization related information, the breach information, and the one or more rules, the code for selecting comprising:
   code for determining, if the one or more geographic locations are in the United States, any applicable attorney general reporting rules and applicable long reach rules associated with the one or more geographical locations,
   code for selecting one or more reporting entities based on the applicable attorney general reporting rules and the applicable long reach rules, and
   code for selecting, if the breach information indicates the breach is related to an international jurisdiction, one or more reporting entities based on rules associated with the international jurisdiction;
   code for selecting one or more reporting entities based on one or more types of breached data, where the one or more types of breached data are determined based on the compromised PII, the selecting comprising:
   code for selecting, if the breached data includes health care related information, at least one reporting entity associated with health care,
   code for selecting, if the breached data includes credit card related information, at least one credit card related entity, and
   code for selecting a reporting entity based on one or more of rules, regulations, and laws associated with the compromised PII;
   code for outputting, if the breach information indicates the breach is related to the United States, the breach report to a United States agency; and
   code for outputting the breach report to the one or more reporting entities.

2. The system of claim 1, further comprising, after executing the code for modifying the breach report, executing:
   code for receiving modified organization related information and modified breach information; and
   code for updating the breach report based on the modified organization related information and modified breach information.

3. The system of claim 1, wherein the code for receiving breach information comprises:
   code for receiving audio representative of breach report information;
   code for converting the audio to text using a speech-to-text conversion process; and
   code for organizing the text into breach event description information, compromised PII, and remediation action information.

4. The system of claim 1, wherein the U.S. agency is one or more of Federal Bureau of Investigation and a federal government agency.

5. The system of claim 1, wherein the at least one reporting entity associated with health care is one or more of Office of Civil Rights, Office of Health and Human Services, and a Secret Service regional office.

6. The system of claim 1, wherein code for receiving breach information comprises:
   code for generating one or more data entry fields including one or more of a breach event description information, compromised PII, and remediation action information data entry field; and
   code for receiving breach information in the one or more data entry fields.

7. The system of claim 6, wherein the one or more data entry fields are pre-populated based on one or more of previously received data breach event description information, compromised PII, and remediation action information related to a previous breach event associated with the organization.

8. The system of claim 1, wherein code for receiving breach information comprises:
   code for generating one or more data entry fields based on previously received breach event information from the organization; and code for receiving breach information in the one or more data entry fields.

9. The system of claim 1, wherein code for receiving breach information comprises receiving the breach information through an application programming interface (API).

10. The system of claim 1, further comprising code for outputting, if the breach information indicates the breach is related to an international jurisdiction, the breach report to an entity associated with the international jurisdiction.

11. The system of claim 1, wherein the international jurisdiction includes one or more of European Union, a government of a foreign country, and a state government in a foreign country.

12. The system of claim 1, wherein the one or more of rules, regulations, and laws associated with the PII include European Union rules related to PII.

13. A computer-implemented system for data breach compliance comprising:
 a processor;
 a memory in communication with the processor; and
 said system configured to:
  receive information related to an organization;
  receive breach in formation relating to a data breach event of the organization, the breach information including breach event description information, compromised personally identifiable information (PII), and remediation action information;
  generate a breach report based on the breach information, the organization related information, and one or more rules related to data breach;
  determine, based on a comparison of the organization related information, the breach information, and one or more of the following: state rules, federal rules, international rules, industry standards, and rules applicable to the breach event, whether the breach report is in the proper format;
  modify the breach report, if it is determined that the proper format is an entity specific format, to include predetermined data entry fields;
  select one or more reporting entities based on one or more geographic locations associated with the data breach event, where the one or more geographical locations are determined based on the organization related information, the breach information, and the one or more rules, wherein the system is configured to:
   determine, if the one or more geographic locations are in the United States, any applicable attorney general reporting rules and applicable long reach rules associated with the one or more geographical locations,
   select one or more reporting entities based on the applicable attorney general reporting rules and the applicable long reach rules, and
   select, if the breach information indicates the breach is related to an international jurisdiction, one or more reporting entities based on rules associated with the international jurisdiction;
  select one or more reporting entities based on one or more types of breached data, where the one or more types of breached data are determined based on the compromised PII, wherein the system is configured to:
   select, if the breached data includes health care related information, at least one reporting entity associated with health care,
   select, if the breached data includes credit card related information, at least one credit card related entity, and
   select a reporting entity based on one or more of rules, regulations, and laws associated with the compromised PII;
  output, if the breach information indicates the breach is related to the United States, the breach report to a United States agency;
  output the breach report to the one or more reporting entities; and
  output the breach report to a reviewing entity.

14. The computer-implemented system of claim 13, wherein the system is further configured to:
 receive, from the reviewing entity, modified organization related information and modified breach information; and
 update the breach report based on the modified organization related information and modified breach information.

15. The computer-implemented system of claim 13, wherein the one or more of rules, regulations, and laws associated with the PII include European Union rules related to PII.

16. The computer-implemented system of claim 13, wherein to receive breach information the system is to:
 receive audio representative of breach report information;
 convert the audio to text using a speech-to-text conversion process; and
 organize the text into breach event description information, compromised PII, and remediation action information.

17. A non-transitory computer readable storage medium having computer executable instructions which when executed by a computer cause the computer to perform operations comprising:
 receiving information related to an organization;
 receiving breach information relating to a data breach event of the organization, the breach information including breach event description information, compromised personally identifiable information (PII), and remediation action information;
 generating a breach report based on the breach information, the organization related information, and one or more rules related to data breach;
 determining, based on a comparison of the organization related information, the breach information, and one or more of the following: state rules, federal rules, international rules, industry standards, and rules applicable to the breach event, whether the breach report is in the proper format;
 modifying the breach report, if it is determined that the proper format is an entity specific format, to include predetermined data entry fields;
 selecting one or more reporting entities based on one or more geographic locations associated with the data breach event, where the one or more geographical locations are determined based on the organization related information, the breach information, and the one or more rules, the selecting comprising the steps of:
  determining, if the one or more geographic locations are in the United States, any applicable attorney general reporting rules and applicable long reach rules associated with the one or more geographical locations,
  selecting one or more reporting entities based on the applicable attorney general reporting rules and the applicable long reach rules, and selecting, if the breach information indicates the breach is related to an international jurisdiction, one or more reporting entities based on rules associated with the international jurisdiction;

selecting one or more reporting entities based on one or more types of breached data, where the one or more types of breached data are determined based on the compromised PII, the selecting comprising the steps of:

selecting, if the breached data includes health care related information, at least one reporting entity associated with health care, selecting, if the breached data includes credit card related information, at least one credit card related entity, and selecting a reporting entity based on one or more of rules, regulations, and laws associated with the compromised PII;

outputting, if the breach information indicates the breach is related to the United States, the breach report to a United States agency; and outputting the breach report to the one or more reporting entities.

18. The non-transitory computer readable storage medium of claim 17, further comprising the operation of outputting, if the breach information indicates the breach is related to an international jurisdiction, the breach report to a entity associated with the international jurisdiction.

19. The non-transitory computer readable storage medium of claim 17, wherein the receiving breach information operation comprises:

receiving audio representative of breach report information;

converting the audio to text using a speech to text conversion process; and organizing the text into breach event description information, compromised PII, and remediation action information.

20. The non-transitory computer readable storage medium of claim 17, comprising, after modifying the breach report, the operation of:

receiving modified organization related information and modified breach information; and updating the breach report based on the modified organization related information and modified breach information.

* * * * *